(12) United States Patent
Thornhill

(10) Patent No.: US 6,698,731 B2
(45) Date of Patent: Mar. 2, 2004

(54) HIGH COMPLIANCE MULTIPLE CHAMBER PISTON FOR FLUID DAMPED ELASTOMER DEVICES

(75) Inventor: Jay Thornhill, Milan, MI (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 10/128,902

(22) Filed: Apr. 24, 2002

(65) Prior Publication Data
US 2003/0201590 A1 Oct. 30, 2003

(51) Int. Cl.$^7$ .................................................. F12F 9/00
(52) U.S. Cl. .................................... 267/140.12; 267/293
(58) Field of Search ..................... 267/140.12, 140.11, 267/141.2, 141.3, 141.6, 293, 219; 248/562, 636

(56) References Cited

U.S. PATENT DOCUMENTS

| 4,588,174 A | 5/1986 | Konishi ................. 267/140.12 |
| 4,697,795 A | * 10/1987 | West ..................... 267/140.12 |
| 4,724,936 A | 2/1988 | Koga et al. |
| 4,728,086 A | 3/1988 | Ishiyama et al. |
| 4,883,260 A | 11/1989 | Kanda |
| 4,893,798 A | 1/1990 | Hibi et al. |
| 4,919,401 A | 4/1990 | Yano |
| 4,982,938 A | 1/1991 | Brenner |
| 5,040,774 A | 8/1991 | Veverka et al. |
| 5,178,376 A | * 1/1993 | Hamaekers et al. ... 267/140.12 |
| 5,190,269 A | 3/1993 | Ikeda et al. |
| 5,195,728 A | * 3/1993 | Skipper .................. 267/140.13 |
| 5,215,292 A | 6/1993 | Ishiyama et al. |
| 5,332,061 A | * 7/1994 | Majeed et al. ......... 267/140.15 |
| 5,344,126 A | 9/1994 | Ishiyama |
| 5,346,191 A | 9/1994 | Rudolf |
| 5,413,319 A | 5/1995 | Hein et al. |
| 5,489,087 A | 2/1996 | Bitschkus |
| 5,711,513 A | 1/1998 | Bretaudeau et al. |
| 6,386,529 B2 | * 5/2002 | Bik et al. ................. 267/293 |
| 6,527,261 B2 | * 3/2003 | Breitfeld et al. ....... 267/140.12 |

* cited by examiner

Primary Examiner—Jack Lavinder
Assistant Examiner—Thomas Williams
(74) Attorney, Agent, or Firm—Harness, Dickey & Pierce, PLC

(57) ABSTRACT

A multiple chamber piston includes a first fluid chamber and a second fluid chamber attached by a first channel and a third fluid chamber connected to a fourth fluid chamber by a second channel. Air chambers are provided between the first fluid chamber and the third fluid chamber as well as the second fluid chamber and the fourth fluid chamber. As a result, when vibration is to be attenuated, walls of the air chambers are able to bend and deform to increase compliance of the overall multiple chamber piston.

7 Claims, 4 Drawing Sheets

HIGH COMPLIANCE MULTIPLE CHAMBER PISTON FOR FLUID DAMPED ELASTOMER DEVICES

FIELD OF THE INVENTION

The present invention generally relates to multiple chamber pistons, and more particularly, the present invention relates to multiple chamber pistons having a high compliance to accommodate lower frequencies.

BACKGROUND OF THE INVENTION

Presently, multiple chamber pistons are used for a plurality of damping applications on a vehicle, including engine mounting and suspension applications. Typically, this cylindrical device has an outer cylindrical surface attached to an unsprung mass, such as the vehicle axle, and the center portion attached to a sprung mass, such as the vehicle body. Additionally, the unsprung mass can be the vehicle engine with the vehicle body being the unsprung mass, thereby attenuating vibrations from the vehicle engine to the vehicle body. Multiple chamber pistons utilize at least two separate passages connecting two separate chambers within the device to attenuate and absorb undesirable vibrations. Each passage connecting respective chambers is tuned by adjusting the overall length and area of the passage. Typically, the lengths and cross sectional areas are chosen to attenuate frequencies of below 20 hertz. Accordingly, the longer and narrower the passage is, the lower the frequency the device attenuates. As a result, it is desirable to provide long and narrow passages within these devices to attenuate low frequencies.

While the present state of the art serves to absorb unwanted vibrations in vehicles, some drawbacks exist. Specifically, during manufacturing, long and narrow passages are often difficult to manufacture. Manufacturing such passages requires the manufacturing processes to hold tight tolerances. And, because the surrounding walls are often an elastomeric material, the possibility of passage collapse increases as the passage is made more narrow. Moreover, longer passages require more distance through the device. As these devices are typically limited in size, it is not always possible to provide a long length passage. The present invention was developed in light of these and other drawbacks.

SUMMARY

In light of these and other drawbacks, the present invention provides a multiple chamber piston for attenuating vibrations in a vehicle that includes a bushing having a first fluid chamber connected to a second fluid chamber by a first channel. The bushing includes a third fluid chamber connected to a fourth fluid chamber by a second channel. The first fluid chamber and the third fluid chamber are separated by an air chamber. The second fluid chamber and the fourth fluid chamber are separated by a second air chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
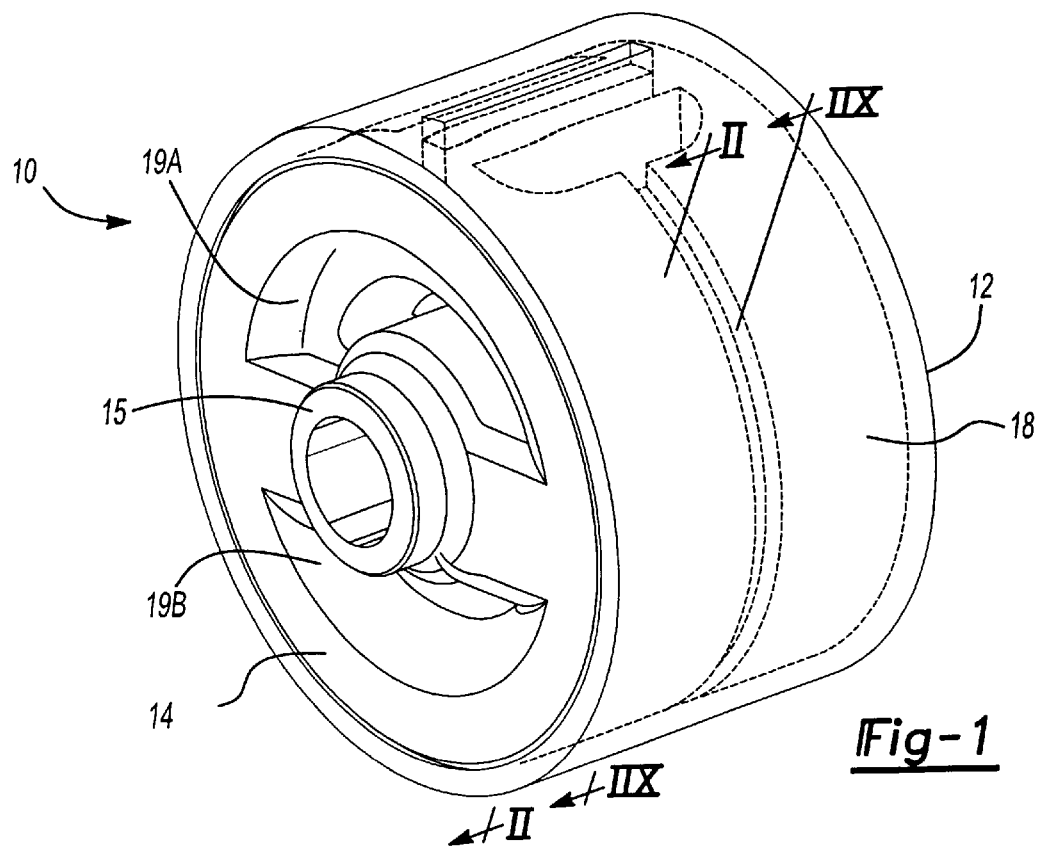
FIG. 1 is a perspective view of a multiple chamber piston bushing according to the present invention.

FIG. 1 shows a multiple chamber piston 10 having an outer metal casing 12 that surrounds and encapsulates a bushing 14. The bushing is centered on hub 15. The outer metal casing is generally cylindrical in shape that is designed to fit around bushing 14. When in an unstressed state (when no external force is being applied to either hub 15 or outer metal casing 12), hub 15 and metal casing 12 share the same axis.

Bushing 14, in turn, has an outermost layer 18 and a second layer 50 that is rigid, made usually of steel or aluminum. The second layer 50 is positioned between outermost layer 18 and a core portion 52. The core portion 52 and outermost layer 18 are preferably made of elastomeric material, and the core portion 52 is preferably glued or adhered to the inside surface of the second layer 50, which is in turn adhered to the outermost layer 18. Hub 15 is generally cylindrical in design with a smaller diameter than metal casing 12 to allow space therebetween for bushing 14. Hub 15 has an aperture therethrough to allow a bolt, screw or other fastening means to pass therethrough for attachment to a vehicle a mass. As such, the outer metal casing 12 is to attach to one mass (either a sprung or unsprung mass), while the hub 15 is to attach to another mass. As a result, vibrations are absorbed by the multiple chamber piston 10 between hub 15 and metal casing 12 as will be described.

Figure 2:
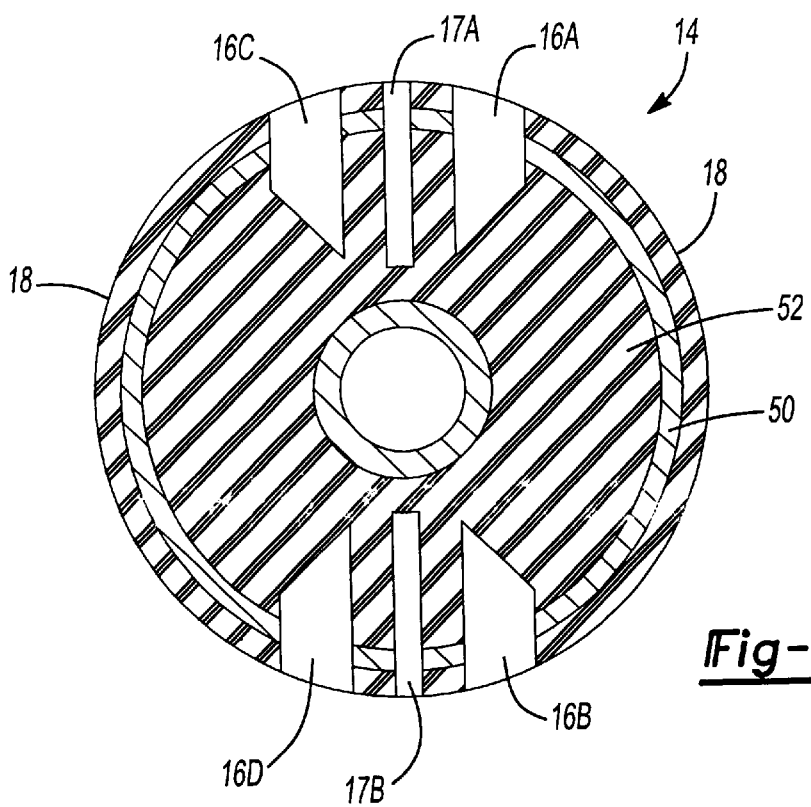
FIG. 2 is a cross-sectional view along II—II of FIG. 1.
Figure 3:
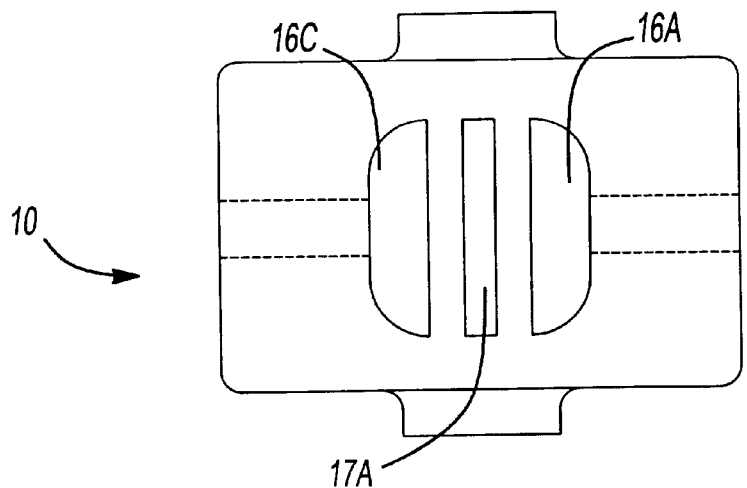
FIG. 3 is a top plan view of a multiple chamber piston bushing without an outer metal casing according to the present invention.

Referring now to FIG. 2, the bushing 14 is shown and described in greater detail. In FIG. 2, bushing 14 is shown having first fluid chamber 16a, second fluid chamber 16b, third fluid chamber 16c and fourth fluid chamber 16d. Additionally, bushing 14 also includes first air chamber 17a and second air chamber 17b. Each of the above described chambers generally begin at the outer surface of bushing 14, passing through second layer 50 and into core 52, and extend inward in a substantially parallel fashion. As a result, when the multiple chamber piston is assembled, each of the above described chambers in bushing 14, except 17a and 17b, are sealed by outer metal casing 12.

Connecting first fluid chamber 16a and second fluid chamber 16b is first channel 18a. Likewise, connecting third fluid chamber 16c and fourth fluid chamber 16d is second channel 18b. first channel 18a and second channel 18b are formed by cutting portions out of outermost layer 18. As a result, these channels are bounded by the cut areas of outermost layer 18 and second layer 50. Preferably, each channel 18a and 18b extends radially around the bushing 14 proximate the surface thereof. These channels serve to connect each chamber to allow fluid flow therebetween. As can be understood, providing each channels 18a and 18b with different cross-sectional areas will serve to provide two different attenuation frequencies, as each allows a different volume of fluid to flow therethrough.

Figure 5A:
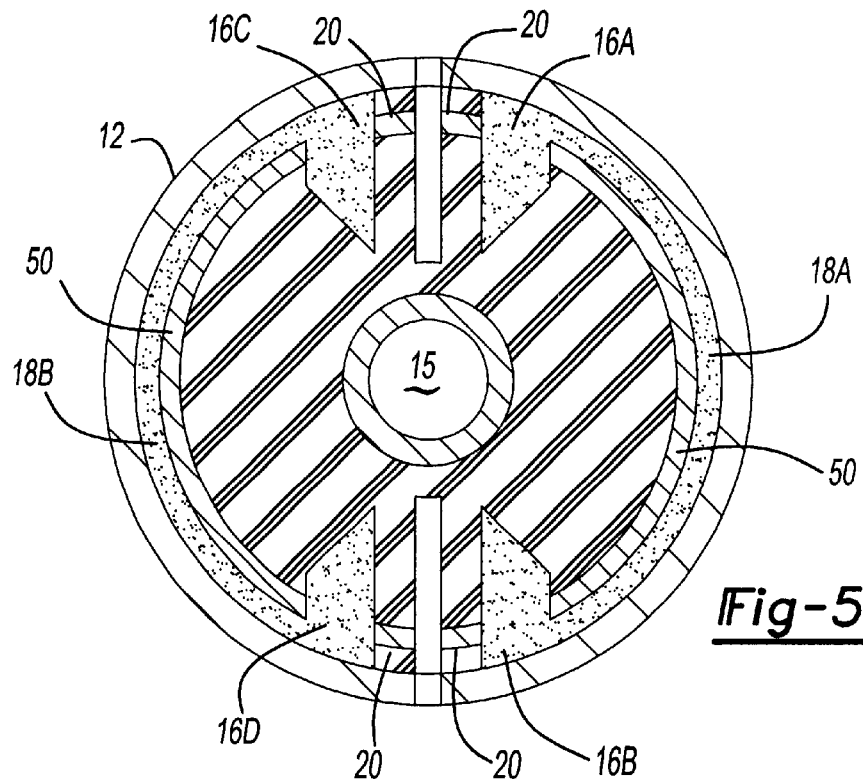
FIG. 5a is a cross-sectional view of a multiple chamber piston bushing in operation according to the present invention.
Figure 5B:
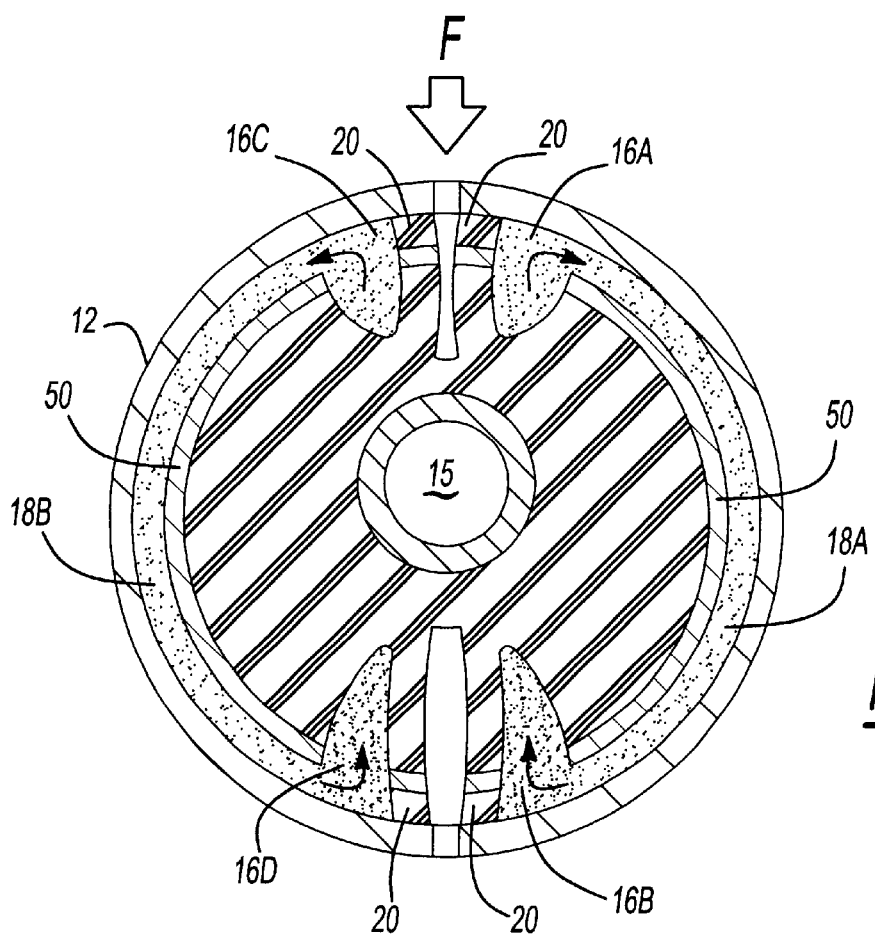
FIG. 5b is a cross-sectional view of a multiple chamber piston bushing in operation according to the present invention.

Referring now to FIGS. 5a and 5b, the operation of the present invention is shown and described. In FIG. 5a, the above described chambers and channels are filled with a fluid. The fluid is preferably a glycol or fluid with an operating temperature as required by automotive manufacturers. In FIG. 5a, a relative force F is applied to the outer metal casing with respect to hub 15. In response to this force F, as shown in FIG. 5b, first fluid chamber 16a, third fluid chamber 16c and first air chamber 17a are deformed as shown. As a result, some fluid contained in first fluid chamber 16a and third fluid chamber 16c is sent via first channel 18a and second channel 18b respectively to second fluid chamber 16b and fourth fluid chamber 16d. However, due to first air chamber 17a, the chamber walls 20 are deformed inward toward first air chamber 17a and second air chamber 17b. However, this can vary depending on the elastic shape. Due to the compliance of walls 20 because of first air chamber 17a and second air chamber 17b, the multiple chamber piston according to the present invention is able to attenuate lower frequencies.

Figure 6:
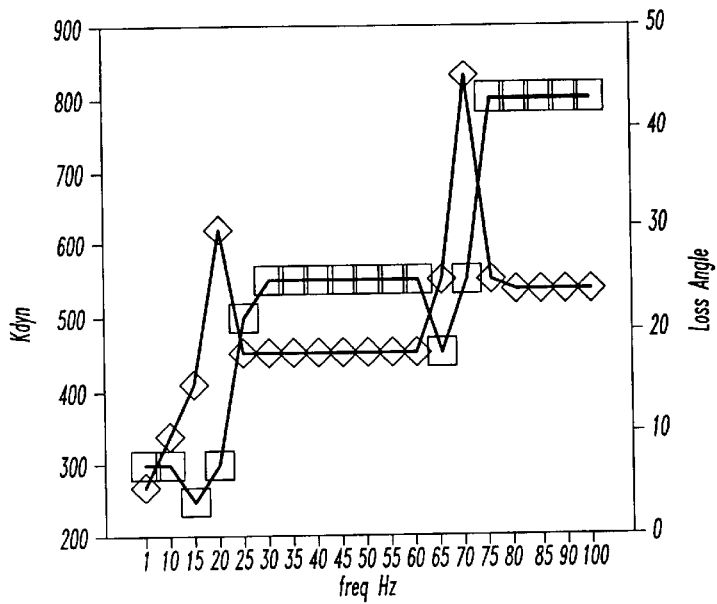
FIG. 6 is a graphical view showing the kdynamic response and loss angle according to the present invention.
Figure 7:
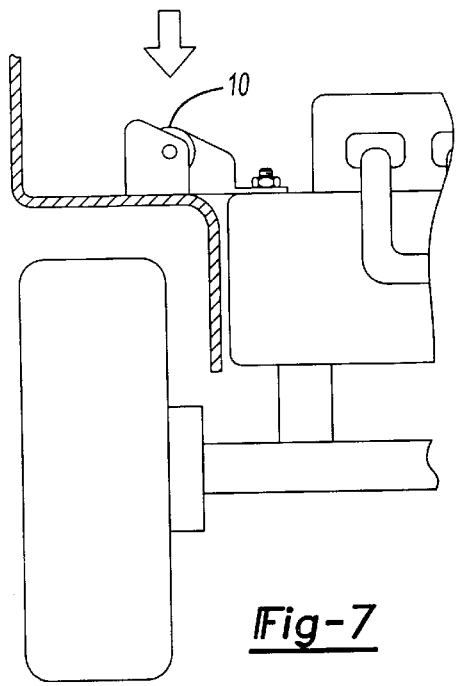
FIG. 7 is a perspective view of a vehicle using a multiple chamber piston bushing according to the present invention.
Figure 8:
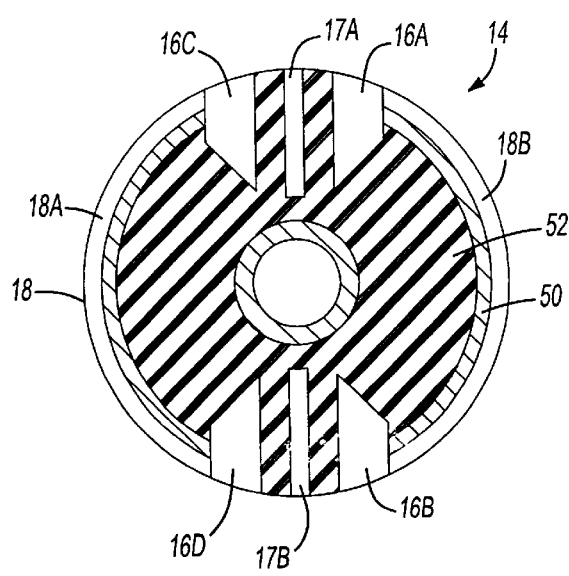
FIG. 8 is a cross sectional view along IIX—IIX of FIG. 1.

In FIG. 6, the Kdynamic response for the multiple chamber piston is shown as A in the legend. As can be seen, two distinct loss angle peaks are achievable through varying the lengths and areas of channels 18a and 18b and the compliance of the walls.

Figure 4:
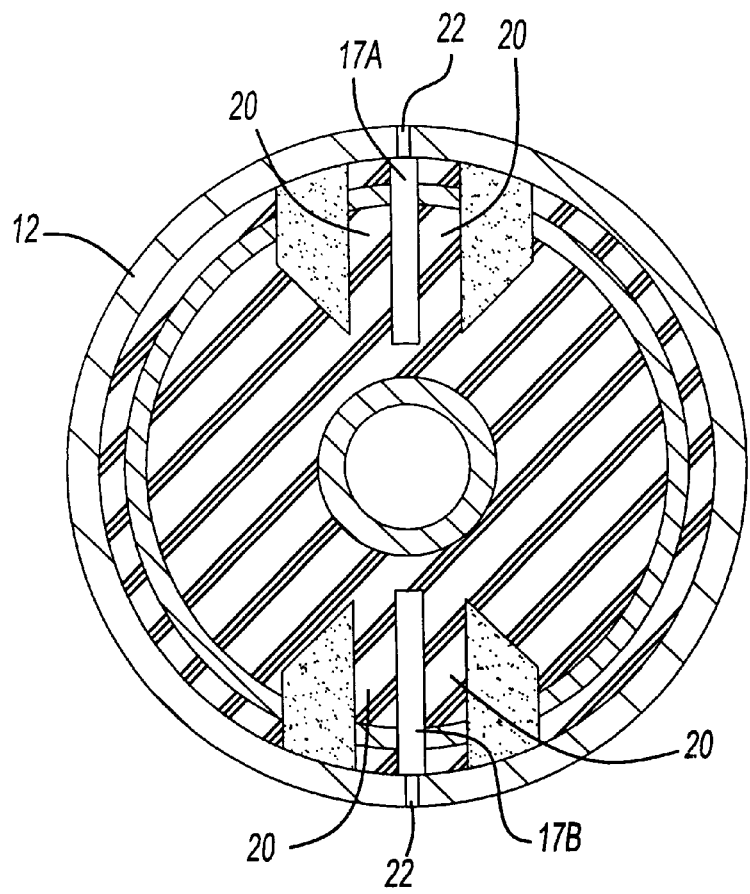
FIG. 4 is a cross-sectional view of a multiple chamber piston bushing according to a second embodiment of the present invention.

Referring now to FIG. 4, a second embodiment of the present invention is shown and described. In FIG. 4, orifices 22 passes through outer metal casing 12 to allow air to pass into and out of first air chamber 17a and second air chamber 17b. This, in turn, provides lower resistance to flexing of walls 20, thereby lowering the compliance of the multiple chamber piston 10 more so than that of the first embodiment described previously. However, it is noted that orifices 22 are not necessary, and that mere air pockets can be used that are completely sealed.

As a result of the above, the walls 20 and the air gap provide additional compliance to the fluid chambers 16 without reducing the overall static spring rate of the bushing. This is not the case for prior art fluid bushings. Prior art fluid bushings can only increase compliance by altering rubber wall sections which typically determine the static rate of the busing.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multiple chamber piston for attenuating vibrations in a vehicle, the multiple chamber piston comprising:
   a bushing having a cylindrical outer surface and including a first fluid chamber connected to a second fluid chamber by a first channel, the bushing further including a third fluid chamber connected to a fourth fluid chamber by a second channel;
   a first air chamber disposed inbetween the first fluid chamber and the third fluid chamber being open to an environment surrounding the multiple chamber piston;
   a second air chamber disposed inbetween the second fluid chamber and the fourth fluid chamber being open to an environment surrounding the multiple chamber piston; and
   an outer metal casing encapsulating an outer circumference of the bushing that seals the first fluid chamber, the second fluid chamber, the third fluid chamber and the fourth fluid chamber; wherein:
      the first channel follows a contour of the outer cylindrical surface of the bushing when passing between the first fluid chamber and the second fluid chamber, the second channel follows the contour of the outer cylindrical surface when passing between the third fluid chamber and the fourth fluid chamber.

2. The multiple chamber piston as claimed in claim 1, further comprising a hub positioned in the bushing.

3. A multiple chamber piston for attenuating the vibration in a vehicle, the multiple chamber piston comprising:
   a bushing having a cylindrical outer surface, the bushing further including:
      a first air chamber and a second air chamber, the first air chamber positioned 180 degrees opposite the second air chamber with respect to the cylindrical outer surface, the first and second air chambers being in communication with an environment outside the multiple chamber piston;
      a first fluid chamber and a second fluid chamber connected by a first channel, the first fluid chamber being positioned adjacent the first air chamber and the second fluid chamber being positioned adjacent the first air chamber and the second fluid chamber being positioned adjacent the second air chamber, a first wall separating the first air chamber and the first fluid chamber and a second wall separating the second fluid chamber and the second air chamber;
      a third fluid chamber positioned adjacent to the first air chamber, a fourth fluid chamber positioned adjacent to the second air chamber, the third fluid chamber connected to the fourth fluid chamber by a second channel, the third fluid chamber separated from the first air chamber by a third wall and the fourth fluid chamber separated from the second air chamber by a fourth wall, the fourth fluid chamber positioned on an opposite side of the bushing from the second fluid chamber, the third fluid chamber being positioned on an opposite side of the bushing from the first fluid chamber; and
   an outer metal casing positioned around the outer cylindrical surface of the bushing; wherein:
      the first channel follows a contour of the outer cylindrical surface of the bushing when passing between the first fluid chamber and the second fluid chamber, the second channel follows the contour of the outer cylindrical surface when passing between the third fluid chamber and the fourth fluid chamber.

4. The multiple chamber piston as claimed in claim 3, further comprising a hub positioned in the bushing.

5. A vehicle comprising:
   a sprung mass portion; and
   an unsprung mass portion attached to the sprung mass portion by a multiple chamber piston, the multiple chamber piston comprising:

an outer metal casing attached to the unsprung mass;

a hub attached to the sprung mass; and a bushing having an outer cylindrical surface positioned between the outer metal casing and the hub, the bushing comprising:

a first fluid chamber connected to a second fluid chamber by a first channel;

a third fluid chamber connected to a fourth fluid chamber by a second channel;

a first air chamber positioned between the first fluid chamber and the third fluid chamber, the first air chamber being open to an environment outside the multiple chamber piston; and a second air chamber positioned between the second fluid chamber and the fourth fluid chamber, the second air chamber being open to an environment outside the multiple chamber piston; wherein:

the first channel follows a contour of the outer cylindrical surface of the bushing when passing between the first fluid chamber and the second fluid chamber, the second channel follows the contour of the outer cylindrical surface when passing between the third fluid chamber and the fourth fluid chamber.

6. A multiple chamber piston for attenuating vibrations in a vehicle, the multiple chamber piston comprising:

a hub;

an outer casing;

a bushing including;

a core portion disposed around the hub;

a second layer disposed around the core portion;

an outermost layer disposed around the second layer, the second layer having an outer surface attached to an inner surface of the outer casing;

a first fluid chamber, a second fluid chamber, a third fluid chamber and a fourth fluid chamber disposed through the second layer and the core portion;

a first air chamber separating the first fluid chamber and the third fluid chamber;

a second air chamber separating the second fluid chamber and the fourth fluid chamber;

wherein the first fluid chamber is connected to the second fluid chamber by a first channel in the outermost layer, the third fluid chamber is connected to the fourth fluid chamber by a second channel in the outermost layer.

7. The multiple chamber piston as claimed in claim 6, wherein the first channel and the second channel have different cross-sectional areas.

* * * * *